United States Patent [19]

Huxford

[11] 4,383,580
[45] May 17, 1983

[54] AGRICULTURAL IMPLEMENTS

[76] Inventor: Paul M. Huxford, Jolly Rd. Galatea, R.D. 1, Murupara, New Zealand

[21] Appl. No.: 217,828

[22] Filed: Dec. 18, 1980

[30] Foreign Application Priority Data

Dec. 20, 1979 [NZ] New Zealand ..................... 192473
Apr. 18, 1980 [NZ] New Zealand ..................... 193480
May 19, 1980 [NZ] New Zealand ..................... 193768

[51] Int. Cl.³ .......................................... A01B 45/02
[52] U.S. Cl. .................................... 172/21; 172/456; 172/554
[58] Field of Search ................. 172/21, 22, 311, 456, 172/540, 554, 548–551, 553, 555, 556

[56] References Cited

U.S. PATENT DOCUMENTS

| | | | |
|---|---|---|---|
| 645,032 | 3/1900 | Johanson | 172/540 |
| 1,681,835 | 8/1928 | Bird | 172/554 X |
| 1,812,708 | 6/1931 | Nygard et al. | 172/549 |
| 2,034,505 | 3/1936 | Cline | 172/21 X |
| 2,244,099 | 6/1941 | Chase | 172/21 |
| 2,574,772 | 11/1951 | Zorn | 172/549 |
| 3,568,777 | 3/1971 | Hook | 172/456 X |
| 3,794,121 | 2/1974 | Drozak | 172/21 |
| 3,901,327 | 8/1975 | Mitchell | 172/456 X |
| 4,151,886 | 5/1979 | Boetto et al. | 172/456 X |
| 4,158,391 | 6/1979 | Clements | 172/554 X |

FOREIGN PATENT DOCUMENTS

| | | | |
|---|---|---|---|
| 1397906 | 3/1965 | France | 172/540 |
| 155050 | 6/1932 | Switzerland | 172/548 |
| 491597 | 9/1938 | United Kingdom | 172/548 |

OTHER PUBLICATIONS

Engineering News–Record 8-1954 vol. 153, No. 6, p. 91 Mechanical Soil Conditioner Aerates.

*Primary Examiner*—Paul E. Shapiro
*Attorney, Agent, or Firm*—Holman & Stern

[57] ABSTRACT

An agricultural implement particularly suitable for aerating soils and pastures comprises a frame attachable to the three-point linkage of a tractor, a plurality of shafts rotatably mounted on the frame and a plurality of cutting blades projecting from each of the rollers. The blades are formed from plate material and are preferably formed to a point. Various edges are preferably bevelled to assist the implement in cutting the soil without undue lifting or tearing of the soil surface.

11 Claims, 11 Drawing Figures

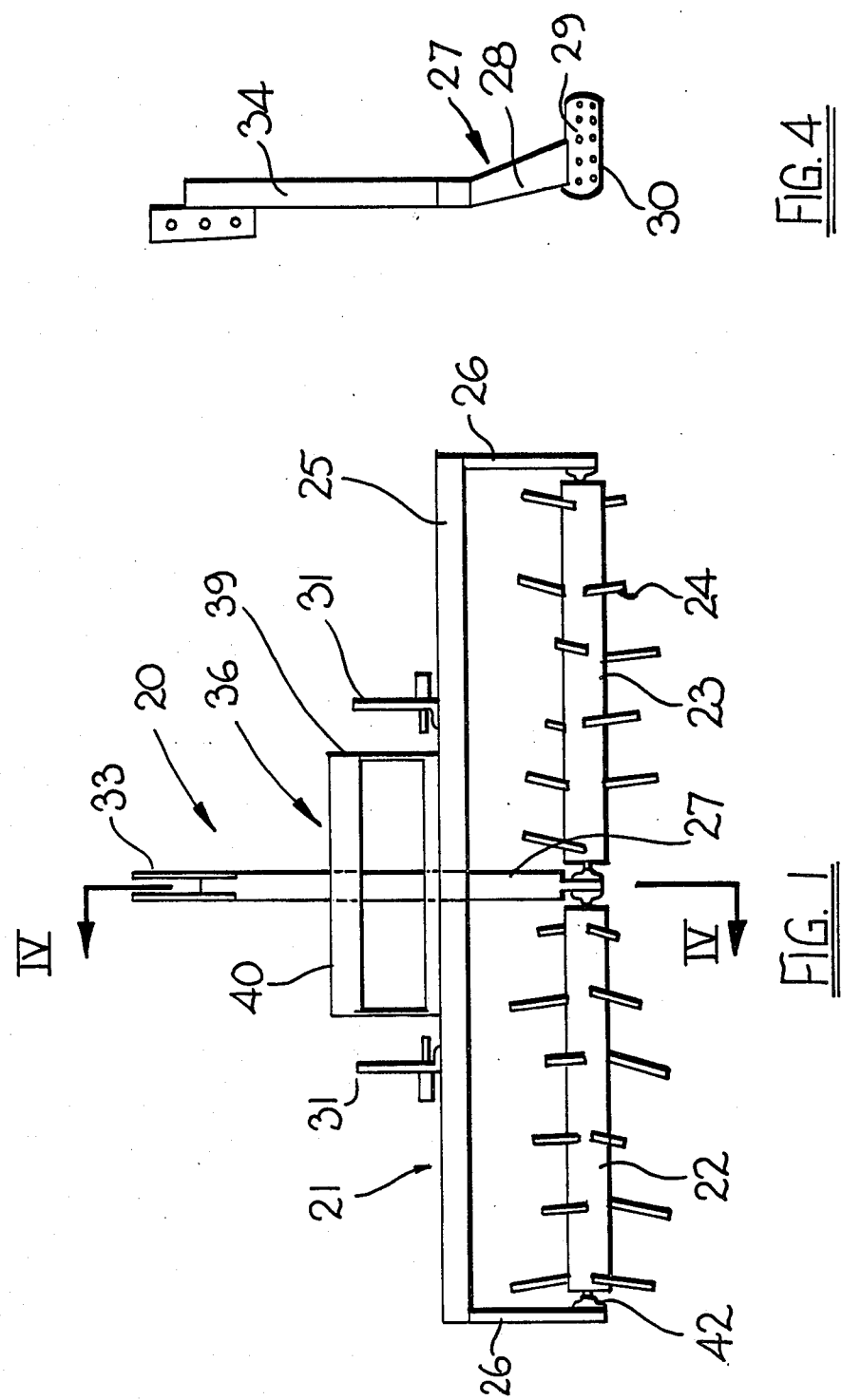

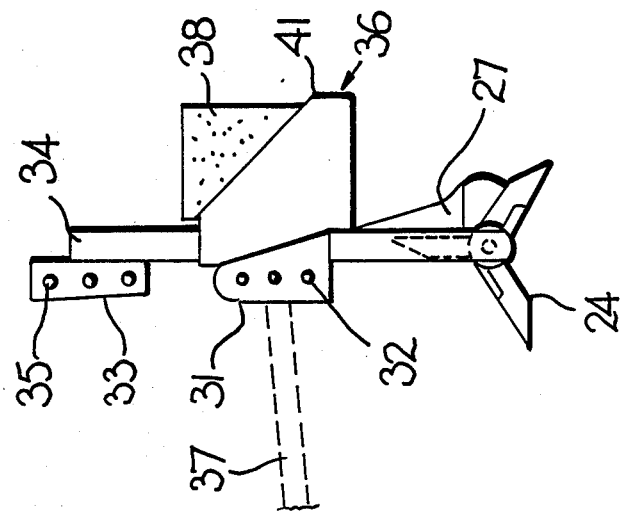
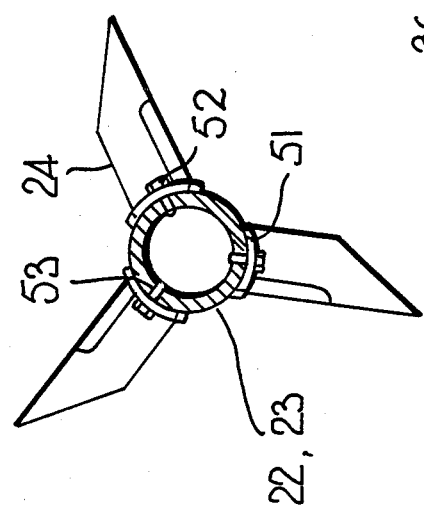
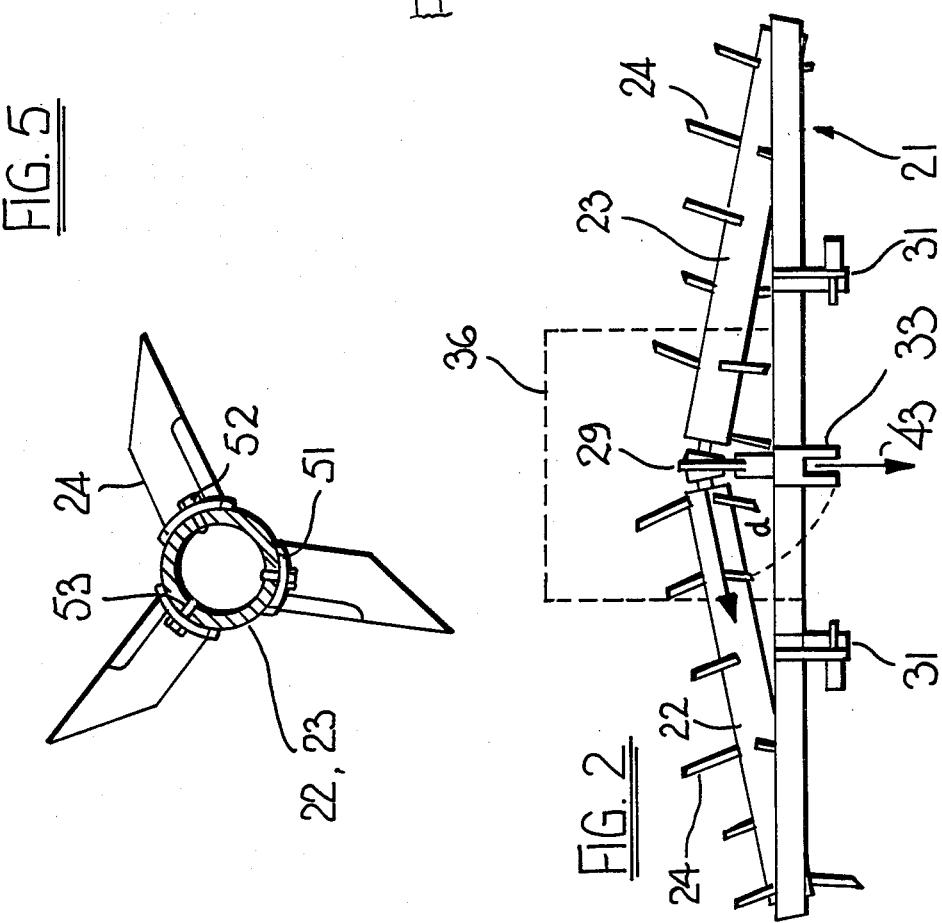

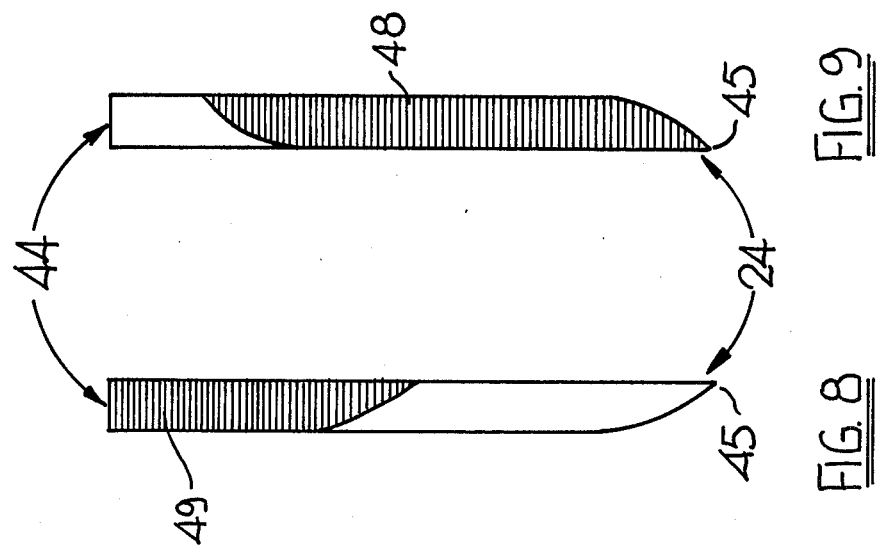
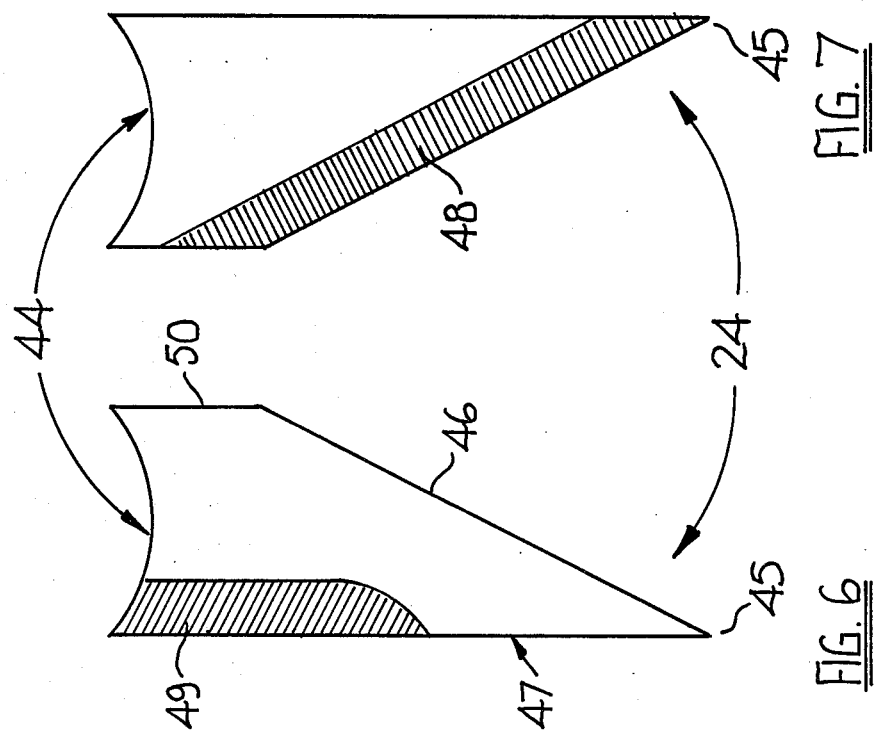

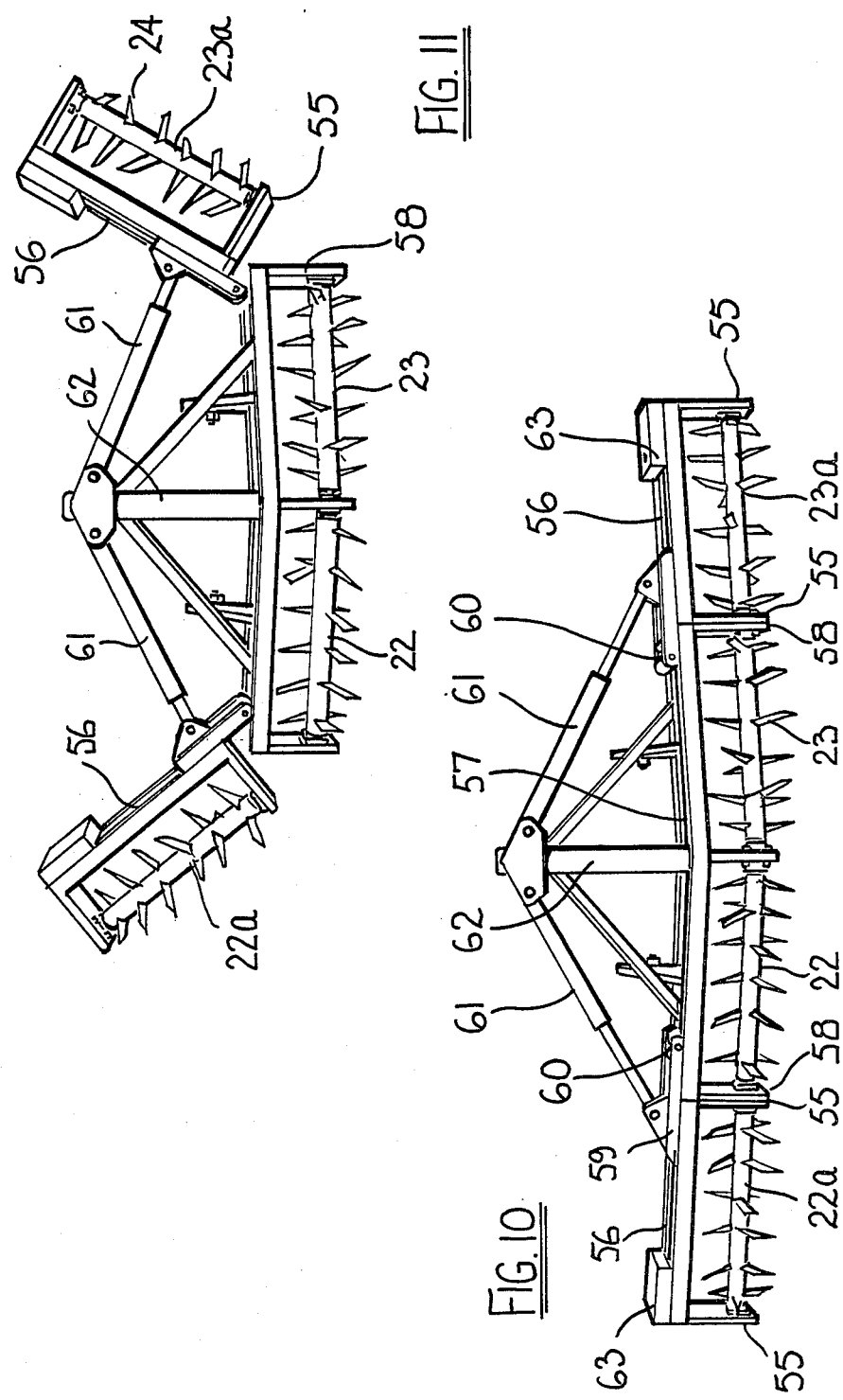

AGRICULTURAL IMPLEMENTS

BRIEF SUMMARY OF THE INVENTION

This invention relates to agricultural implements particularly applicable for aerating soil and pastures.

The invention consists in an agricultural implement comprising a frame constructed and arranged for mounting on a prime mover so as to, in use, be drawn by the prime mover along the direction of travel thereof; a plurality of shafts rotatably mounted on or within said frame, the angle between the axes of said shafts and said direction of travel being such that contact between said shafts and the ground when said implement is being drawn by the prime mover causes said shafts to rotate; and a plurality of ground cutting members projecting from each of the shafts. Each of said ground cutting members is substantially planar and is mounted on one of the shafts for substantially edgewise engagement with the ground, and is further constructed and arranged so that when viewed along the axis of the shaft, the outermost part of said ground cutting member is narrower than the root thereof.

To those skilled in the art to which this invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

BRIEF DESCRIPTION OF THE DRAWINGS

One preferred embodiment of the invention and modifications thereof will now be described with reference to the accompanying drawings in which:

FIG. 1 shows a front elevational view of one form of an agricultural implement according to the invention;

FIG. 2 shows a top plan view of the apparatus depicted in FIG. 1, certain parts being omitted for clarity;

FIG. 3 shows a side elevational view of the apparatus depicted in FIGS. 1 and 2;

FIG. 4 shows a view along the line IV—IV in FIG. 1;

FIG. 5 shows an enlarged cross sectional view of one of the rotatable shaft members further showing a mounting arrangement for the ground cutting members;

FIG. 6 shows one side view of a ground cutting member for use in the implement according to the invention;

FIG. 7 shows the opposite side view;

FIG. 8 shows a left hand edge view of the ground cutting member depicted in FIG. 6;

FIG. 9 shows a right hand edge view of the ground cutting member depicted in FIG. 6;

FIG. 10 shows a rear perspective view of an alternative embodiment of agricultural implement according to the invention in an operative positione, and FIG. 11 shows the apparatus depicted in FIG. 10 in a non-operative or transport configuration.

DETAILED DESCRIPTION

Referring to the drawings and in particular to FIGS. 1 to 9 the invention provides an agricultural implement 20 comprising a frame 21 constructed and arranged for mounting on a prime mover (not shown) so as to be drawn by the prime mover along the direction of travel thereof; a plurality of shafts 22 and 23 rotatably mounted on or within the frame 21, the angle $\alpha$ between the axes of the shafts 22 and 23 and the direction of travel being such that the contact between said shafts and the ground when the implement is being drawn by the prime mover, causes the shafts 22 and 23 to rotate; and a plurality of ground cutting members 24 projecting from each of the shafts 22 and 23 so as to engage the ground, the ground cutting members 24 each being substantially planar and being mounted on the shafts 22 and 23 for substantially edgewise engagement with the ground. As can be better seen from FIGS. 6 to 9, each of the ground cutting members 24 is constructed and arranged so that when mounted on the shafts 22 and 23 and viewed along the axes of the shafts the outermost part of each of the members 24 is narrower than the root thereof.

Referring to FIGS. 1 to 4, the frame 21 comprises a cross member 25 of substantial dimensions and sufficient to withstand the forces imposed on the implement as the ground cutting members 24 are driven into soils and pastures. The cross member 25 may be a single steel beam or may, for example, be fabricated from suitable steel sections.

Projecting from the underside of the cross member 25 are the shaft mounting arms. The shaft mounting arms comprise two outer arms 26 which are preferably rectangular steel plates and a central arm 27 comprising a skeg 28 mounting a bracket 29 having apertures 30 drilled therein, the purpose of which will be described hereinafter. The skeg 28 is preferably slightly rearward of the shaft mounting positions on each of the outer arms 26 when the apparatus is viewed in side elevation.

The frame 21 is preferably constructed and arranged for attachment to and displacement by a conventional agricultural tractor and accordingly preferably provided with suitable means for attachment to the three point linkage of an agricultural tractor. To this end plates 31 provided with apertures 32 are welded or otherwise fixed to the upper edge of the cross member 25 to engage with the outer links of the three point linkage and further plates 33 mounted on subframe 34 projecting above the cross member 25 are provided to engage the central, top linkage of the three point linkage, the plates 33 including apertures 35 through which pins (not shown) may be passed to retain the top link of the three point linkage therebetween.

It will be appreciated that each of the plates 31 and 33 include a series of three apertures 32, 35 respectively therein. It will be further appreciated that if the pivoting points of the tractor link, shown in dotted outline by reference numeral 37 in FIG. 3, on the tractor lie in a plane below the pivoting points of the links on the frame 21, then a downward component of force will be applied to the frame. This has been found to be desirable, in some instances, to assist the ground cutting members 24 to penetrate the soil or pasture surface. Accordingly the greater the degree of downward force required, the higher the mounting aperture is selected on the brackets 31 and 33. A further advantage in providing a plurality of mounting apertures on the brackets 31 and 33 arises because of the fact that tractors may be provided with tires of differing diameter which results in varying angles between the links of the three point linkage and the apparatus 20.

While some degree of downforce may be obtained by arrangement of the mounting brackets 31 and 33, the apparatus 20 preferably further includes static weight to provide a vertical loading on the frame and thereby press the ground cutting members 24 into the soil or pasture. This weight may be provided in the construction of the apparatus 20, e.g. by making the cross member 25 or shafts 23 of heavy material, however in the embodiment depicted in FIGS. 1 to 4 a carrier 36 is provided in which a block or blocks 38 of massive material such as concrete may be retained to provide a vertical loading on the apparatus.

The carrier 36 is preferably fabricated from steel plate and comprises side plates 39 interconnected by front plate 40 and rear plate 41. The side plates 39 are preferably notched to provide clearance around the cross member 25 and allow the front plate 40 to be slipped over the sub-frame 34. The carrier 36 is thus vertically supported by cross member 25 however the moment created by block or blocks 38 is reacted by the front plate 40 acting on the front surface of sub-frame 34.

The weight of the block or blocks 38 is subject to some variation depending on the magnitude of the apparatus and depending on the nature of the soils or pastures to be aerated, however I have found satisfactory results are obtained using apparatus substantially in the form depicted in FIGS. 1 to 4 wherein the bare weight of the apparatus is about 170 Kg, the length of each of the ground cutting members 24 is substantially 24 mm from root to tip and the weight of the block 38 is approximately 400 Kg.

The shafts 22 and 23, as shown in FIG. 5, comprise hollow steel members which are mounted, in a common plane below and substantially parallel to cross members 25, between the arms 26 and 27 on regreasible self-aligning bearings 42.

It will be noted from FIG. 2 that the shafts are mounted at angle $\alpha$ to the direction of travel of the apparatus 20 indicated by arrow 43. The angle $\alpha$ is such as to allow the shafts 22 and 23 to rotate as the ground cutting members 24 engage the ground surface when towed by a prime mover. The angle $\alpha$ may be in the range 70°-90° but is preferably in the range of 80°-85°. The harder the soil the greater the angle $\alpha$.

The apparatus as herein described is preferably constructed and arranged so that the angle may be varied within the preferred range and to this end the mounting points of the self aligning regreasible bearings 42 may be varied on the bracket 29. Apertures 30 on the bracket 29 correspond to the mounting apertures on the bearings 42 and by selecting different apertures 30 to mount the bearings 42 on the inner ends of the shafts 22 and 23, the angle of the shaft may be varied. The positioning of the apertures 30 is preferably such that the angle of the rollers 22 and 23 may be set at 80°, 82½°, and 85° to the direction of travel. Other embodiments however may allow further variation over a wide or narrower range.

Referring now to FIGS. 6 to 9 the ground cutting members 24 are formed from planar material such as steel plate and when viewed in side elevation, as shown in FIGS. 6 and 7, the outermost part thereof is narrower than the root 44 thereof. It will be appreciated in the embodiment described the outermost part of each of the ground cutting members is formed to a tip 45.

It will be appreciated that the combination of the shafts 22 and 23 rotating and the apparatus 20 being displaced in the direction of arrow 43 reverses the leading and trailing edges of the ground cutting member 24. During the initial insertion of the ground cutting member into the ground the edge 46 constitutes the leading edge. However when the edge 46 has penetrated the ground and the ground cutting member 24 is projecting substantially vertically downward from the shafts 22 and 23, the edge 47 then becomes the leading edge and remains so until further rotation of the shaft 22, 23 raises the ground cutting member from the soil.

To assist initial penetration of the ground cutting member into the ground the edge 46 is bevelled at 48 as shown in FIG. 7. To assist the edge 47 in its function as leading edge and to prevent the soil being pushed ahead of the ground cutting members as the apparatus is displaced across the ground surface, edge 47 is partially bevelled at 49 from a point intermediate the length thereof to the root thereof.

As further shown, the edge 46 converges obliquely to meet the edge 47, projecting substantially radially from the shaft 22,23, at the tip 45 and at the other end meets edge 50 which projects parallel to the edge 47.

The ground cutting members once formed are preferably case hardened.

The ground cutting members may be permanently mounted on the shafts 22, 23 by, for example, welding or may as shown in FIG. 5, be removably mounted on the shafts 22,23. As shown in FIG. 5, each of the ground cutting members 24 is mounted on an arcuate flange 51 which includes suitable apertues (not shown) through which bolts 52 may be passed, the bolts 52 engaging in threaded apertures 53 provided in the shafts 22, 23.

Whichever form of mounting is selected the ground cutting members are preferably mounted on the shafts 22, 23 so that the planes thereof are angled to the axis of the shafts toward the outer ends thereof. While this angle may lie in the range of 70°-90° to the axis of the shaft, the angle is preferably set at 85° to the axis of the shaft. The angle is preferably such that at no time does the angle of the ground cutting member to the axis of the shaft exceed the angled of the shaft to the direction of travel of the apparatus.

It will be appreciated that by angling the ground cutting members to the shafts the initial penetration thereof into the ground is made easier as the alignment of the blade is closer to the direction of travel. Once in the ground, however, the aerating function is enhanced as the blades are twisted through a greater angle as they pass under the central axis of the shafts 22,23.

As shown also in FIG. 5, the ground cutting members 24 are preferably provided in series of three, the members of each series being equi-spaced about the periphery of the shafts 22,23. Further series of ground cutting members 24 are preferably spaced along the length of the shafts, six such series being shown on each of the shafts 22,23 in the drawings, and each series is preferably circumferentially staggered from the adjacent series to ensure complete penetration and aeration of the soil or pastures. In the embodiment each series is circumferentially staggered at 60° from the adjacent series.

Referring now to FIGS. 10 and 11, the apparatus as above described may be modified by the addition of further shafts and ground cutting members which may be mounted in parallel or series to the shafts of the basic arrangement as described above.

As shown in FIGS. 10 and 11 two additional shafts are provided, one of which is provided in series with each of the shafts 22 and 23 in the apparatus above described. The additional shafts are designated 22a and 23a in the drawings.

The additional shafts 22a and 23a are mounted between shaft mounting arms 55 projecting downwardly from beam extensions 56 which in turn are pivotally mounted at either end of cross member 57.

When the apparatus is in the operative configuration as shown in FIG. 10, the shaft mounting arms 55 lie in juxtaposition with outer shaft mounting arms 58 projecting downwardly from either end of the cross member 57 and the shafts 22,22a and 23, 23a, respectively are substantially co-axial. However when the apparatus is in the transport or raised configuration as shown in FIG. 11, the beam extensions 56 are raised to raise the arms 55 out of juxtaposition and tilt the shafts 22a and 23a out of axial alignment with the shaft 22 and 23 respectively.

Brackets 59 are provided on each of the beam extensions 56, the brackets 59 being pivotally mounted at 60 to the cross member 57. Displacement means 61 preferably in the form of hydraulic rams are provided which are connected between the sub-frame 62, which includes the central mount for the tractor three point linkage, and the brackets 59 so that upon retraction of the rams 61 the beam extensions 56 and shafts 22a and 23a are raised to the position as shown in FIG. 11.

The rams 61 are preferably single acting rams capable of raising the extensions 56 only and accordingly the apparatus as configured and arranged so that the extensions may only be raised to approximately 85° so that when the rams 61 are released the extensions 56 may fall under gravity to the operative configuration.

The apparatus as shown in FIGS. 10 and 11 is preferably constructed and arranged so that the weight necessary to drive the ground cutting members 24 into the ground is provided in the apparatus itself and to this end cross member 57 and beams extensions 56 are preferably formed from solid steel billet. Auxiliary weights 63 may be provided to retain the extensions 56 in the operative configuration.

It will thus be appreciated that the present invention provides a relatively simple yet effective means of aerating soils in pastures, the configuration of the shafts and the ground cutting members imparting a cutting and twisting action to the soil which has been found to considerably enhance the soil quality and hence the growth of grasses and crops grown in the soil.

What is claimed is:

1. A ground driven agricultural implement comprising a frame constructed and arranged for mounting on a prime mover to be drawn thereby in use in the direction of travel thereof, a plurality of shafts rotatably mounted on said frame with their axes at an angle of 80°–87.5° with respect to said direction of travel, and a plurality of substantially planar ground cutting and penetrating members mounted on each of said shafts with the plane of each cutting member at an angle between 82.5°–87.5° with respect to the axis of the respective shaft extending between said cutting member and the outer end of said respective shaft, so that said cutting members have substantially edgewise engagement only with the ground, each cutting member having a peripheral configuration so that when viewed along the axis of the respective shaft on which it is mounted the radially outermost part is narrower than the root thereof when it is mounted on said shaft, said angle of said axes of said shafts with respect to said direction of travel being such that contact between said cutting members and the ground when said implement is drawn by the prime mover rotatably drives each shaft.

2. An implement as claimed in claim 1 wherein said frame is constructed and arranged for mounting on the three point linkage of an agricultural tractor serving as the prime mover.

3. An implement as claimed in claim 1 or claim 2 and further comprising a static weight mounted on said frame to displace said ground cutting members into the ground when in use.

4. An implement as claimed in claim 1 wherein the angle between said shafts and the direction of travel is adjustable.

5. An implement as claimed in claim 1 wherein each of said ground cutting members is formed to a point at the outermost part thereof.

6. An implement as claimed in claim 5 wherein said point is defined by a first edge of said ground cutting member which extends substantially radially from said shaft and a second edge which extends substantially obliquely from said first edge radially inwardly, said first edge defining the leading edge when said ground cutting member is pointing vertically downward.

7. An implement as claimed in claim 6 wherein said second edge meets a third edge of said blade which extends to said shaft substantially parallel to said first edge.

8. An implement as claimed in claim 6 or claim 7 wherein said second edge is bevelled.

9. An implement as claimed in claim 8 wherein a section of said first edge between a point on the length thereof and the root thereof is bevelled.

10. An implement as claimed in any one of claims 1, 5 or 6 wherein at least two additional shafts are provided, each of said additional shafts being displaceable between positions in which each of said additional shafts are substantially coaxial with one of said plurality of said shafts and a further position in which said additional shafts lie in planes above the plane of said plurality of shafts.

11. An implement as claimed in claim 10 wherein said additional shafts are rotationally displaceable between said two positions.

* * * * *